United States Patent
Hallerström Sjöstedt et al.

(10) Patent No.: US 9,300,617 B2
(45) Date of Patent: Mar. 29, 2016

(54) METHOD AND DEVICE FOR GRAPHICAL INDICATOR OF ELECTRONIC MESSAGES

(71) Applicant: Research In Motion Limited, Waterloo (CA)

(72) Inventors: Svante Magnus Ulfstand Hallerström Sjöstedt, Malmö (SE); Marcus Eriksson, Malmö (SE)

(73) Assignee: BLACKBERRY LIMITED, Waterloo, Ontario (CA)

( * ) Notice: Subject to any disclaimer, the term of this patent is extended or adjusted under 35 U.S.C. 154(b) by 270 days.

(21) Appl. No.: 13/896,531

(22) Filed: May 17, 2013

(65) Prior Publication Data

US 2014/0344711 A1    Nov. 20, 2014

(51) Int. Cl.
  *G06F 3/0481* (2013.01)
  *H04L 12/58* (2006.01)

(52) U.S. Cl.
  CPC .............. *H04L 51/22* (2013.01); *G06F 3/0481* (2013.01); *H04L 51/34* (2013.01)

(58) Field of Classification Search
  CPC .. H04L 61/00; G06F 3/0481; G06F 17/30882
  See application file for complete search history.

(56) References Cited

U.S. PATENT DOCUMENTS

| | | | |
|---|---|---|---|
| 8,023,975 B2 | 9/2011 | Wickman et al. | |
| 8,291,347 B2 | 10/2012 | Bocking | |
| 8,676,273 B1* | 3/2014 | Fujisaki | H04M 1/6505 379/142.06 |
| 8,814,698 B1* | 8/2014 | Lee | A63F 13/53 463/29 |
| 2007/0061488 A1* | 3/2007 | Alagappan | G06F 17/30905 709/246 |
| 2007/0129112 A1 | 6/2007 | Tarn | |
| 2007/0136679 A1* | 6/2007 | Yang | H04N 5/44513 715/772 |
| 2008/0037582 A1* | 2/2008 | Wang | G06Q 10/107 370/466 |
| 2008/0126951 A1* | 5/2008 | Sood et al. | 715/752 |
| 2008/0270560 A1* | 10/2008 | Tysowski et al. | 709/207 |
| 2009/0040228 A1* | 2/2009 | Lee et al. | 345/440 |
| 2009/0210823 A1* | 8/2009 | Bocking | 715/821 |
| 2009/0234845 A1* | 9/2009 | DeSantis | H04L 43/026 |
| 2010/0009750 A1* | 1/2010 | Egozy | A63F 13/005 463/35 |

(Continued)

OTHER PUBLICATIONS

Mailroom—"Gmail and Google Apps Mail Client" (Version 1.7.5.1) Creator: David Martorana Accessed from: iTunes URL : https://itunes.apple.com/ca/app/mailroom-gmail-google-apps/id355023563?mt=8 (Accessed on Jan. 7, 2013); version 1.7.5.1., updated Jan. 19, 2012.

(Continued)

*Primary Examiner* — Steven Sax
(74) *Attorney, Agent, or Firm* — Perry + Currier, Inc.

(57) ABSTRACT

A number of unread messages having a time of reception within a time interval can be determined. A number of read messages having a time of reception within the time interval can also be determined. A number of unseen messages may also be determined. A graphical indicator can be output to represent the number of unread messages relative to the number of received messages. The graphical indicator can show a proportion of the number of unread messages to a total number of messages received within the time interval and can also show a proportion of the number of read messages to the total number. The graphical indicator may further show a proportion of the number of unseen messages to the total number of messages. A group of message indicators of unseen messages can be displayed as separated from message indicators of other messages by a gap.

21 Claims, 10 Drawing Sheets

(56) References Cited

U.S. PATENT DOCUMENTS

| | | | |
|---|---|---|---|
| 2010/0082391 A1* | 4/2010 | Soerensen | G06Q 10/1095 705/7.19 |
| 2010/0240425 A1* | 9/2010 | Madsen | H04M 1/0239 455/575.4 |
| 2011/0173522 A1 | 7/2011 | Gupta | |
| 2011/0302249 A1* | 12/2011 | Orr | G06Q 10/107 709/206 |
| 2011/0302525 A1* | 12/2011 | Jeon | H04M 1/72552 715/786 |
| 2012/0059744 A1 | 3/2012 | Abecassis et al. | |
| 2013/0232074 A1* | 9/2013 | Carlson | G06Q 20/42 705/44 |
| 2014/0280534 A1* | 9/2014 | Bell | H04L 65/403 709/204 |
| 2014/0298470 A1* | 10/2014 | Yablokov | G06F 21/56 726/24 |

OTHER PUBLICATIONS

Corresponding European Patent Application No. 13 16 8336.9 Search Report dated Sep. 26, 2013.

* cited by examiner

| NUMBER OF UNSEEN 120 | NUMBER OF UNREAD 122 | NUMBER OF READ 124 | TOTAL FOR TIME INTERVAL 126 |
|---|---|---|---|
| 2 | 3 | 6 | 11 |

METHOD AND DEVICE FOR GRAPHICAL INDICATOR OF ELECTRONIC MESSAGES

FIELD

This disclosure relates to electronic devices and related methods, and more particularly, to a method and device for outputting a graphical indicator of electronic messages.

BACKGROUND

Electronic messaging provides for rapid communication between electronic devices. The amount of content communicated can be large relative to the amount of time spent by users in processing the content. Information related to messages, such as their quantities, is displayed to aid the user in message consumption processing. However, known techniques fail to allow for quick and unambiguous assessment within limited screen space or otherwise information-rich interfaces.

BRIEF DESCRIPTION OF THE DRAWINGS

The drawings illustrate, by way of example only, embodiments of the present disclosure.

DETAILED DESCRIPTION

The embodiments described in the present disclosure relate to a graphical indicator that visually indicates relative amounts of read and unread messages, so as to give a user an indication of progress in reading, consuming, or otherwise processing incoming messages. A time interval over which to count read and unread messages is configured to aid with message processing. Unseen messages, such as messages not yet shown in a messaging listing, can also be shown in the graphical indicator. Thus, the user can be provided with an unambiguous and rapidly intelligible indication of the status of message processing, particularly on a device that has a relatively small screen and may have content areas that provide large amounts of information that competes for the user's attention. Other kinds of graphical indicators can be provided for visually distinguishing unseen messages from messages of other statuses. Such indicators can include a gap, animation, or color. Further, although the present disclosure references email messages, it should be understood that other kinds of discrete, time-based, user-created messages are also contemplated.

Figure 1:
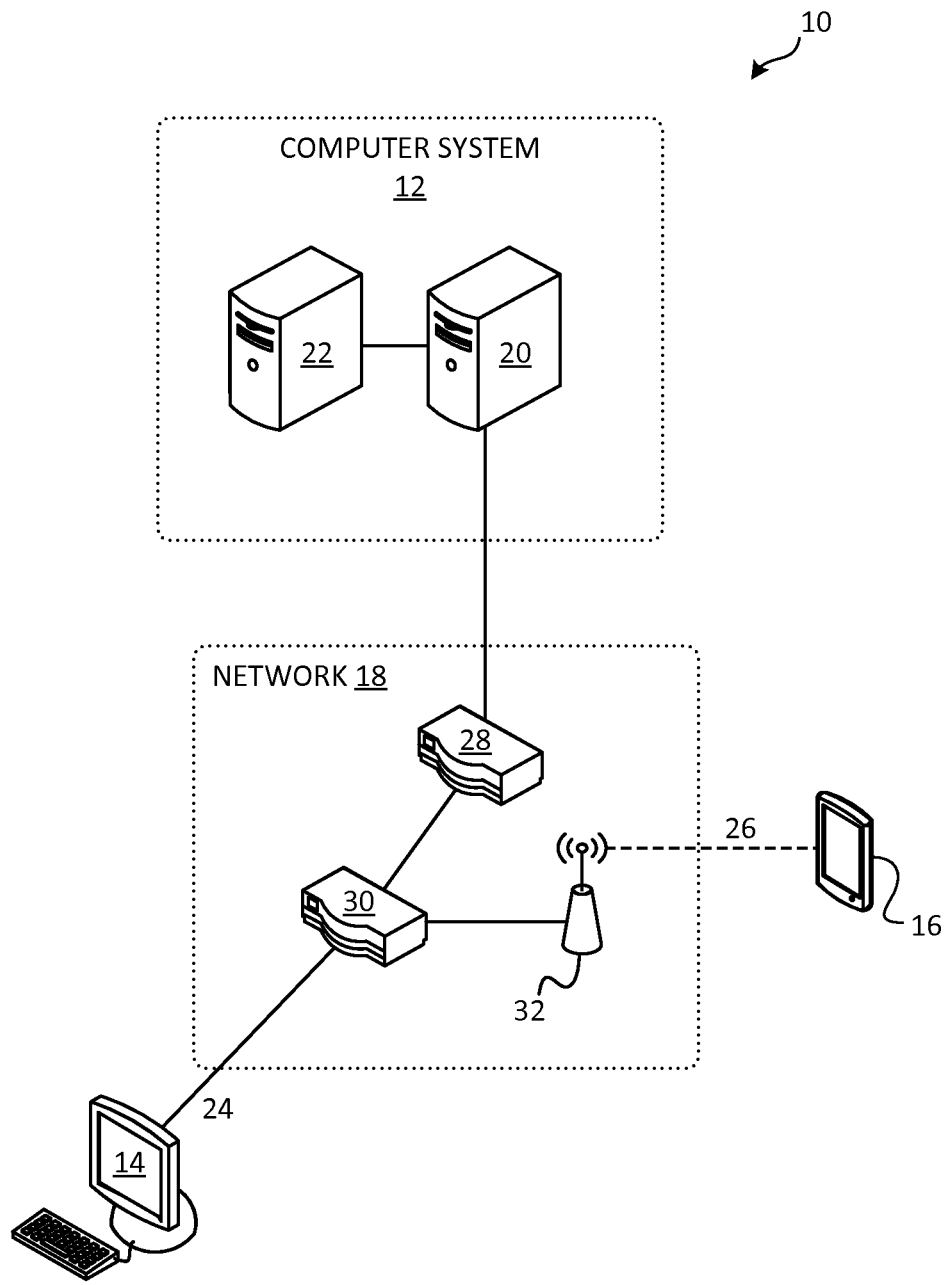
FIG. 1 is a diagram of a system according to an embodiment of the present disclosure.

FIG. 1 shows a system 10 according to an embodiment of the present disclosure. The system 10 includes a computer system 12, a plurality of electronic devices 14, 16, and a network 18 that connects the plurality of electronic devices 14, 16 to each other and to the computer system 12. The electronic devices 14, 16 are remote to the computer system 12.

The computer system 12 can include one or more servers 20, 22. The servers 20, 22 can be computers or other specialized devices for processing messages sent among the plurality of electronic devices 14, 16. Each of the servers 20, 22 may be configured for a specific purpose within the computer system 12. Alternatively or additionally, servers 20, 22 may be configured for redundancy. For example, one of the servers 20, 22 may be configured to send and receive messages, such as email messages, among the electronic devices 14, 16, while another of the servers 20, 22 may be configured to store messaging account information, such as messaging addresses, identities, credentials, and similar.

The plurality of electronic devices 14, 16 can include devices such as desktop computers, laptop computers, tablet computers, mobile phones, smart phones, and the like. Some of the electronic devices 14 may be configured to be used in a stationary setting, while others of the electronic devices 16 may be mobile or portable. Accordingly, each of the plurality of electronic devices 14, 16 can be connected to the network 18 via one or more of a wired link 24 and a wireless link 26.

The network 18 can include network devices 28, 30, 32 such as routers, switches, servers, firewalls, wireless access points, cellular telephone base stations and towers, and the like. The network 18 may include one or more of a local-area network, a wide-area network, a peer-to-peer network, an Internet service provider's network, a cellular telephone network, an intranet, and the Internet.

Figure 2:
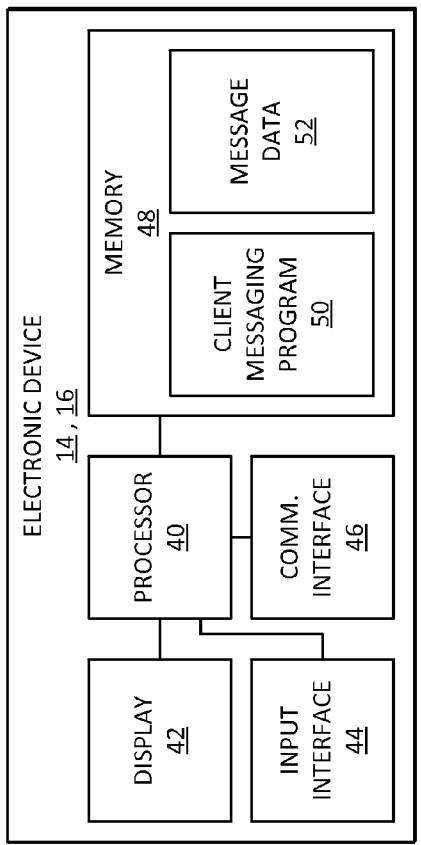
FIG. 2 is a block diagram of an electronic device.

FIG. 2 shows an example of an electronic device 14, 16. The electronic device 14, 16 can include one or more processors 40, a display 42, an input interface 44, a communications interface 46, and memory 48. The display 42, input interface 44, communications interface 46, and memory 48 may be coupled to the processor 40 and to each other via a data bus or other data connection.

The processor 40 is configured to execute instructions originating from the memory 48 or the communications interface 46 to perform methods or processes described herein. The processor 40 can include one or more processing cores. Multiple interconnected processors can be provided as the processor 40.

The display 42 is a device capable of displaying visual output generated by the processor 40. The display 42 can include one or more devices such as a liquid crystal display (LCD), a light-emitting diode (LED) display, and the like.

The input interface 44 can include one or more devices such as a touch-sensitive element that is physically part of the display 42, a keypad or keyboard having physical keys, a trackpad or touchpad responsive to finger movement, a mouse, buttons, a microphone, and the like.

The communications interface 46 can include one or more communications adaptors suitable for the type of link or links 24, 26 (FIG. 1) used by the electronic device 14, 16 in communicating with the network 18 or in communicating directly with other electronic devices 14, 16. Such adaptors can include wired network adaptors (e.g., Ethernet) and wireless network adaptors (e.g., WiFi, 3G, LTE, Bluetooth™, etc).

The memory 48 stores programs and data for use by the processor 40. The memory 48 can include volatile and non-volatile memory devices such as RAM, flash memory, ROM, hard drives, and like non-transitory computer-readable media.

The memory 48 stores a client messaging program 50 that allows the electronic device 14, 16 to communicate electronic messages, such as email messages, with other electronic devices 14, 16. The client messaging program 50 includes instructions and data that configure the processor 40 to generate the interfaces, respond to input, and perform the methods and processes, as discussed herein.

The memory 48 further includes a message store that stores message data 52 for one or more user addresses, such as an email address, associated with one or more electronic messaging accounts accessible at the electronic device 14, 16. Message data 52 can further store an encryption key and other data associated with the electronic messaging account. Message data 52 can further store message content, message statuses (e.g., read, unread, unseen, urgent), and message relationships for message threads.

Figure 3:
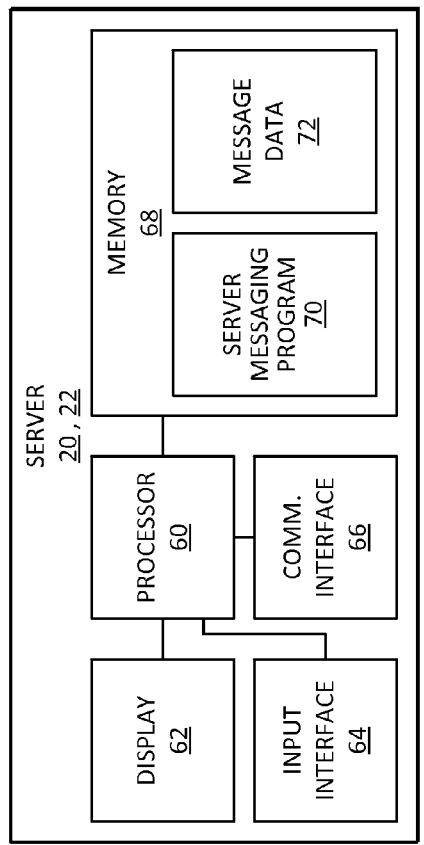
FIG. 3 is a block diagram of a server.

FIG. 3 shows an example of a server 20, 22. The server 20, 22 can include one or more processors 60, a display 62, an input interface 64, a communications interface 66, and memory 68. The display 62, input interface 64, communications interface 66, and memory 68 may be coupled to the processor 60 and to each other via a data bus or other data connection.

The processor 60 is configured to execute instructions originating from the memory 68 or the communications interface 66 to perform methods or processes described herein. The processor 60 can include one or more processing cores. Multiple interconnected processors can be provided as the processor 60.

The display 62 is a device capable of displaying visual output generated by the processor 60. The display 62 can include one or more devices such as an LCD, an LED display, and the like.

The input interface 64 can include one or more devices such as a touch-sensitive element that is physically part of the display 62, a keypad or keyboard having physical keys, a trackpad or touchpad responsive to finger movement, a mouse, buttons, a microphone, and the like.

The communications interface 66 can include one or more communications adaptors suitable for communicating with the network 18 or with other servers 20, 22. Such adaptors can include wired network adaptors and wireless network adaptors.

The memory 68 stores programs and data for use by the processor 60. The memory 68 can include volatile and non-volatile memory devices such as RAM, flash memory, ROM, hard drives, and like non-transitory computer-readable media.

The memory 68 stores a server messaging program 70 that allows communication of electronic messages among the electronic devices 14, 16. The server messaging program 70 includes instructions and data that configure the processor 60 to process and send electronic messages and to perform the methods and processes discussed herein.

The memory 68 further stores message data 72 for the user addresses associated with the electronic messaging accounts accessible at the electronic device 14, 16. Message data 72 can further include encryption keys, login credentials, and other data associated with the electronic messaging accounts. Message data 72 can further store message content, message statuses (e.g., read, unread, unseen), and message relationships for message threads.

Figure 4:
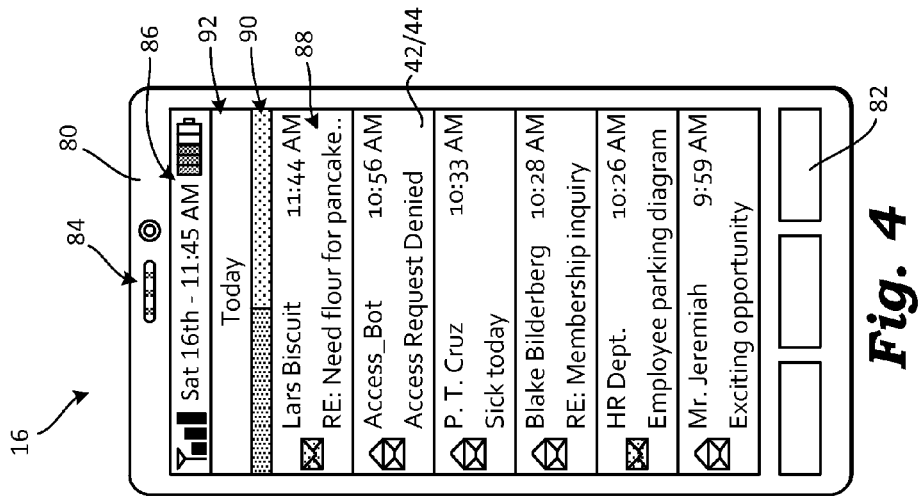
FIG. 4 is a front view of a mobile electronic device showing a message listing interface.

As shown in FIG. 4, the electronic device 16 can be a mobile or portable electronic device, and may be known as a mobile phone, smart phone, tablet computer, or the like.

In this embodiment, the electronic device 16 includes a housing 80 configured to hold the operational components of the electronic device 16. The electronic device 16 can further include physical buttons 82, which may form part of the input interface 44, and other components 84, such as a speaker, microphone, camera, and the like.

In this embodiment, the display 42 is a touch-screen, so the input interface 44 includes touch-sensitive elements of the display 42. The electronic device 16 may also include a physical keyboard, such as a full keyboard (e.g., QWERTY keyboard), that also forms part of the input interface 44.

The electronic device 16 is configured to display a status area 86 at the display 42. The status area 86 may show information relevant to the overall operation of the electronic device 16, such as network signal strength, date/time, battery charge level, and the like.

The electronic device 16 is further configured to display various user interfaces for messaging on the display 42, such as a message listing interface 88. The message listing interface 88 is configured to display user-interface elements for messages or message threads, and may be configured to be sorted in reverse-chronological order, in chronological order, by subject, by sender, and in other ways. The input interface 44 is configured to receive selection of a message or message thread in the message listing interface 88 and, in response, cause the message or message thread to be opened and shown in a message reading interface (ref. 160 of FIG. 8). The input interface 44 is further configured to receive other commands, such as a command to compose a new message, delete a message or message thread, and the like.

The processor 60 of the electronic device 16 is configured to output to the display 42 a graphical indicator 90 that graphically represents a proportion of a number of unread messages to a total number of messages received during a time interval and, further, graphically represents a proportion of a number of read messages to the total number. Thus, the graphical indicator 90 indicates the relative proportions of unread and read messages for a specific time interval, such as the current day. A time-interval indicator 92 can be outputted by the processor 60 to the display 42 to be displayed next to the graphical indicator 90, and the time-interval indicator 92 can show an indication of the time interval (e.g., the text "Today"). The time-interval indicator 92 being next to the graphical indicator 90 can, in some embodiments, be taken to mean that there is no content shown between the time-interval indicator 92 and the graphical indicator 90, though it is not necessary for the time-interval indicator 92 and the graphical indicator 90 to be in close proximity or to be touching.

Each of the numbers and proportions discussed herein can be represented by a value that can be stored and maintained in the memory 68. Such values can be stored as variables, class properties, or other suitable data structures. Values may be stored as integers, strings, floating-point numbers, or the like, as determined based on implementation requirements.

The graphical indicator 90 can be a bar or other shape that has colored regions sized to indicate proportions. For example, a left, darker region can be used to indicate unread messages and a right, lighter region can be used to indicate read messages. In the example shown, the left region is shorter than the right region, thereby indicating that fewer messages are unread than read. This can advantageously provide a user with a quick and unambiguous indication as to the status of received message processing. For instance, a shorter left region can indicate that the user is making rapid progress through incoming messages, while a longer left region may indicate that the user is required to pay more attention to incoming messages.

Figure 5:
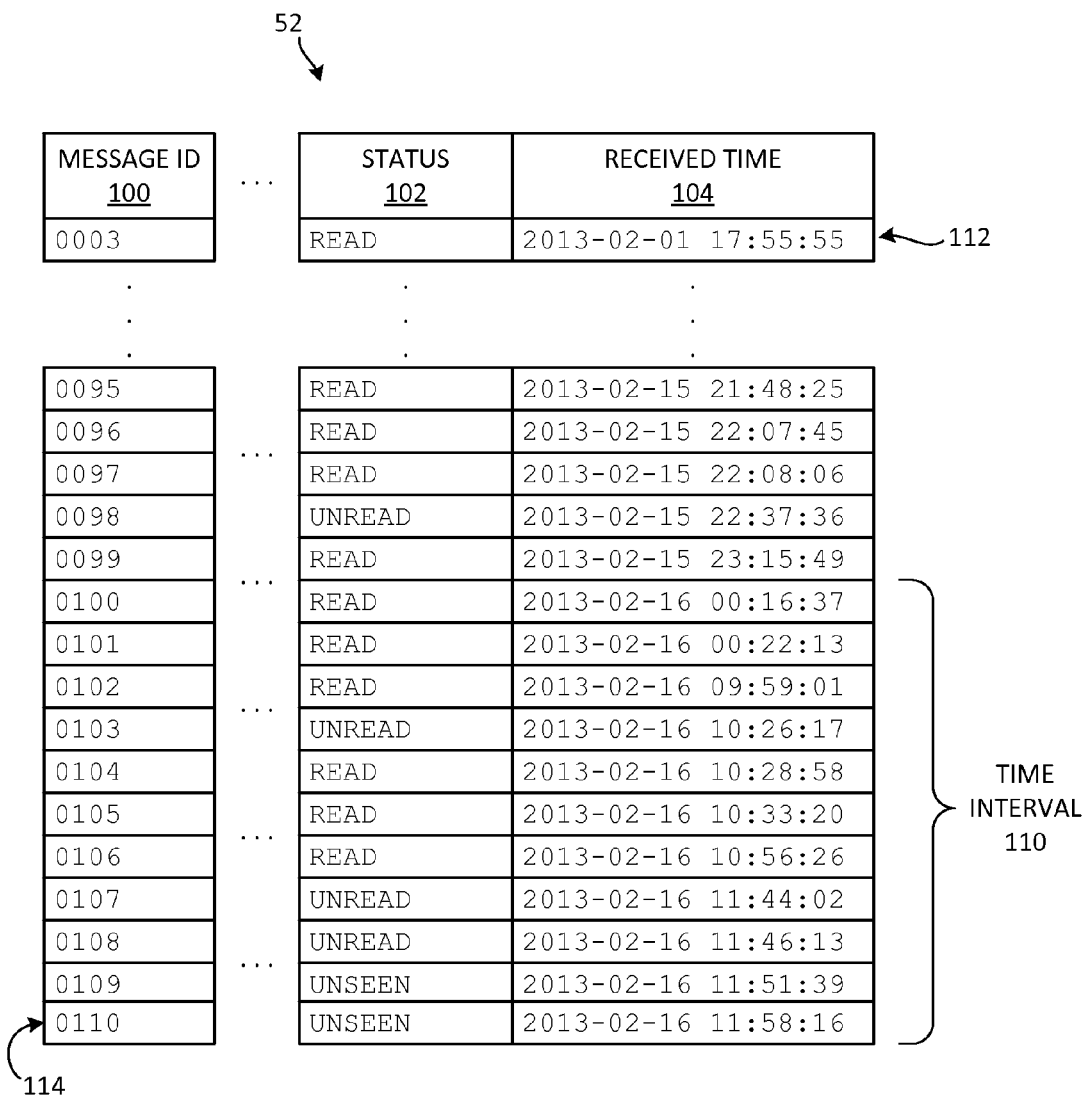
FIG. 5 is a diagram of a table storing message data.

FIG. 5 shows a table of received message data 52 stored at the electronic device 16. Message data 52 can include message identifiers 100, message statuses 102, and message received times 104, among other data not shown to preserve clarity. Each row of message data 52 can correspond to a different message of a plurality of received messages.

The message identifiers 100 are assigned values that uniquely identify messages within the message data 52 at the device 16.

The message statuses 102 contain indications of message statuses, such as read, unread, and unseen. In this embodiment, a message status changes from "unread" to "read" when at least a portion of a message body of an unread message is displayed within the message reading interface (ref. 160 of FIG. 8). Messages having a status of "unseen" are those messages that have not yet been viewed in the message listing interface 88 (FIG. 4). That is, "unseen" messages are those messages that have arrived at the device 16 since the most recent displaying of a message listing interface.

The message received times 104 include timestamps or other time indications of approximately when messages were received at the electronic device 16.

The received message data 52 shown is merely an illustrative example, and message data having different formats and structures is contemplated. The message data 52 may be kept synchronized with the message data 72 at the server 20, 22, and further, the message data 52 may contain fewer messages than retained at the server 20, 22.

A time interval 110 can be determined by the electronic device 16 so as to select a subset of the messages represented by the data 52. Accordingly, the time interval 110 can be selected as shorter than a range of time from the reception of an oldest message 112 to reception of a newest message 114. Examples of suitable time intervals 110 include hour, day, week, month, etc. The time interval 110 can be selected as the current hour, day, week, month, etc, as defined by a clock of the electronic device 16. In the example illustrated, the time interval 110 is selected as the current day, and hence identifies all messages received on the current day (e.g., Feb. 16, 2013). Depending on the specific time interval determined, the number of messages in the message store can be greater than the number of messages received within the time interval. The time interval 110 can identify a variable and generally increasing number of received messages that demand the attention of the user of the device 16.

The electronic device 16 can be configured to determine the time interval 110 based on one or more time intervals that can be stored in the memory 68 of the device 16. The time interval 110 may be user-specified, may be pre-programmed (e.g., default) and configured to be overridden by user-inputted preference, may be determined dynamically by the device 16, or may be based on a combination of such. The time interval 110 may be device-specified, and thus determined by the device 16 based on an earliest message received time, or similar information. For example, the device 16 may determine a default time interval as the interval between the current time and the time of earliest message received, while providing for input of a user-specified time interval (e.g., current week, today, past hour, etc.). Irrespective of the origin of the time interval 110, the processor 60 of the electronic device 16 is configured to determine the time interval 110 or select a time interval from a plurality of time intervals 110, each of which may be pre-programmed, user-specified, device-specified, or provided in a similar manner.

Figures 6, 7:
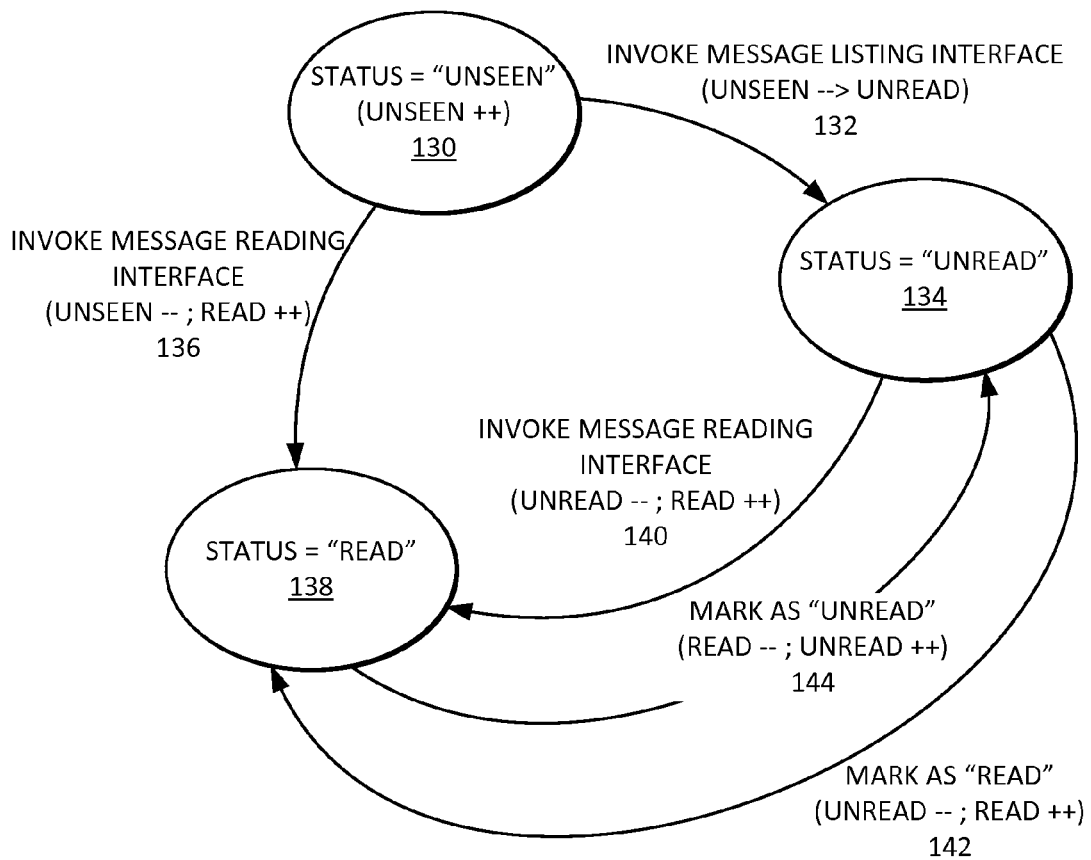
FIG. 6 is a diagram of message status counts.
FIG. 7 is a state diagram of changes in message status.

Referring to FIG. 6, numbers of messages within the time interval 110 can be determined according to message statuses 102 (FIG. 5). Determined numbers can include a number 120 of unseen messages, a number 122 of unread messages, and a number 124 of read messages. A total number 126 of received messages can also be determined. Any of the determined numbers 120-126 can be linked to the graphical indicator 90 (FIG. 4) programmatically, so that as the numbers 120-126 change, the appearance of the graphical indicator 90 also changes. Programmatically linking the numbers 120-126 to the graphical indicator 90 can be achieved, for example, by storing the numbers 120-126 as properties or variables of an object that references such properties or variables in a redraw event. Thus, whenever the object is redrawn (e.g., during a system-wide user-interface refresh event), the graphical indicator 90 is drawn to visually indicate the relevant numbers 120-126. The counting or updating of the numbers 120-126 themselves can be configured to be performed in response to message actions, such as receiving a new message, deleting a message, and filing a message. This permits the graphical indicator 90 to be updated in real time or near real time.

With reference to FIG. 7, the message counts 120-126 are updated by the client messaging program 50 according to predetermined logic. In this embodiment, a newly received message has its initial status set to "unseen", at 130, which increments the number 120 of unseen messages. When the message listing interface (FIG. 4) is invoked, at 132, all received messages of status "unseen" have their statuses updated to "unread", at 134. Such messages are now considered "seen" but "unread", as it is assumed that the user is aware of the messages without being aware of the full content of the message bodies. When the message reading interface (ref. 160 of FIG. 8) is invoked for an unseen message, at 136, then the number 120 of unseen messages is decremented and the number 124 of read messages is incremented as the status of such message is set to "read", at 138. When the message reading interface is invoked for an unread message, at 140, then the number 122 of unread messages is decremented and the number 124 of read messages is incremented as the status of such message is set to "read", at 138. The same hold true when a command to mark an "unread" message as "read" is executed, at 142, without invoking the message reading interface. Further, a command to mark a "read" message as "unread" can be executed, at 144, which decrements the number 124 of read messages and increments the number 122 of unread messages.

Figure 8:
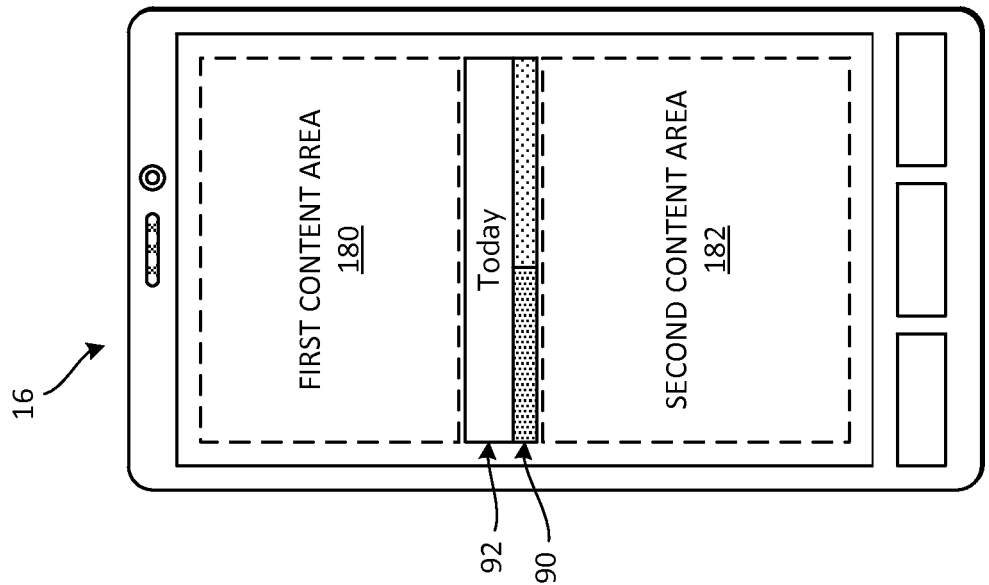
FIG. 8 is a front view of the mobile electronic device showing a message reading interface.

The logic shown in FIG. 7 tends towards invoking the message reading interface 160 shown in FIG. 8, as this is the interface by which the user can fully process the message (or at least confirm that the message requires no processing). As can be seen, the message reading interface 160 can include a subject field 162, a sender address field 164, a sent date-time field 166, a recipient field 168, a copy address field 170, and a message content area 172 to display corresponding underlying data of a message being read at the mobile electronic device 16. The message content area 172 is configured to display the entire body of the selected message. For long message bodies, the message reading interface 160 can provide for scrolling so that the entire message can be processed by the user.

In one example, a home screen or other user interface is being displayed on the device 16 when a new message is received. Accordingly, the number 120 (FIG. 6) of unseen messages is increased by one, at 130 of FIG. 7. The user then commands the device 16 to invoke the message listing interface 88 (FIG. 4), which shows the graphical indicator 90 as updated to reflect a newly arrived but unread message. Next, the user commands the device 16 to invoke the message reading interface 160 (FIG. 8) to view the content of the message body. When the user returns to the message listing interface 88, the graphical indicator 90 reflects that the newly received message has been read. Thus, as messages are consumed by the user, the graphical indicator 90 acts as a kind of progress bar by which the user can gauge his/her progress in dealing with arriving messages.

Figure 9:
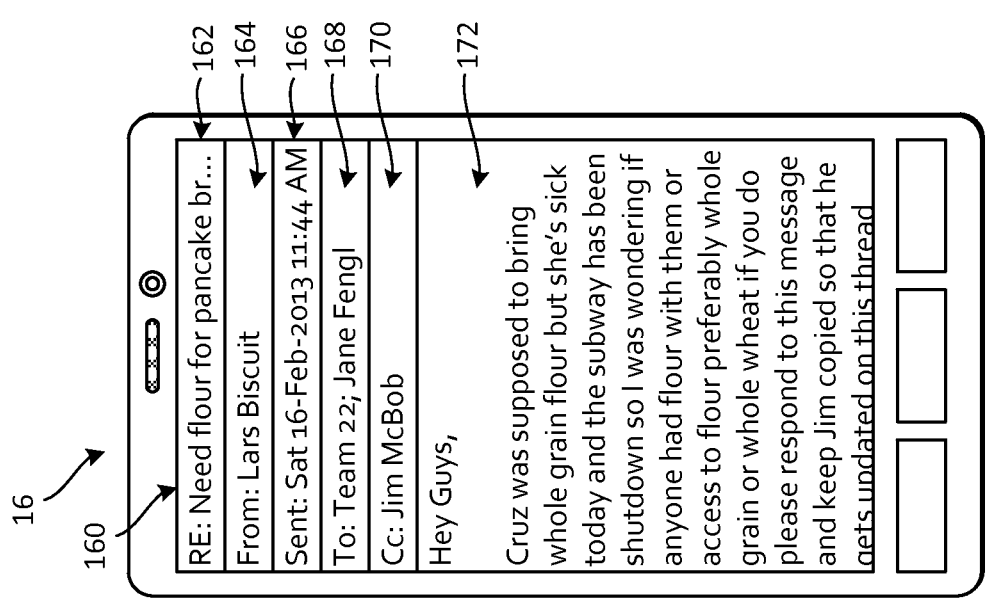
FIG. 9 is a front view of the mobile electronic device showing user interface areas separated by a graphical indicator.

Although the graphical indicator 90 has been discussed in the context of the message listing interface 88 of FIG. 4, this is not to be taken as limiting. With reference to FIG. 9, the graphical indicator 90 and the related time-interval indicator 92 can be provided to any user interface of the device 16. In this embodiment, the graphical indicator 90 and the related time-interval indicator 92 separate two content areas 180, 182, which are configured to display content or other user-intelligible information pertaining to the operation of the device 16. The two content areas 180, 182 show different content. In some embodiments, the first content area 180 and the second content area 182 display different elements of the following: a set of icons to launch or activate applications, a calendar or portion thereof, an event agenda for the time interval indicated by the time-interval indicator 92, a portion of a message listing, content relevant to recent activity on the device 16 within the time interval indicated by the time-interval indicator 92, content relevant to upcoming activity on the device 16 with respect to the time interval indicated by the time-interval indicator 92, device status information, and similar.

Thus, the graphical indicator 90 acts to visually separate the information contained in the two content areas 180, 182, while at the same time serving to provide information regarding message statuses. This is advantageous, as it provides for an efficient use of limited display space, particularly when the device 16 is a smart phone or similarly small-screened device.

Figure 10:
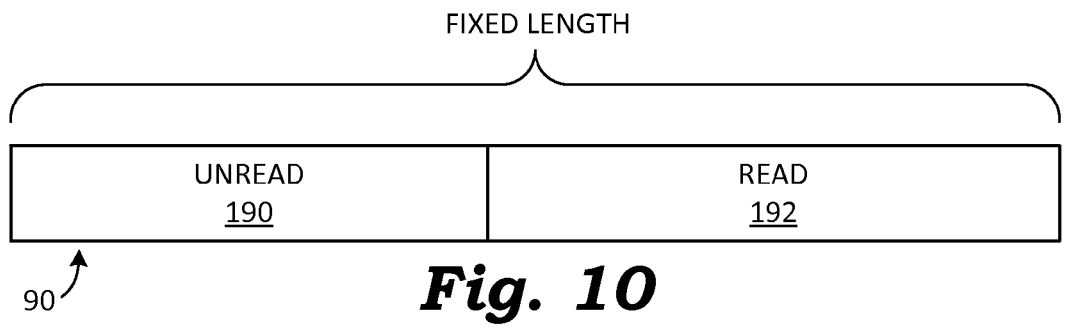
FIG. 10 is a diagram of the graphical indicator for read and unread messages.

FIG. 10 shows a diagram of the graphical indicator 90. In this embodiment, the graphical indicator 90 is a fixed-length rectangular bar having proportions defined by different colors. An unread portion 190 of the bar has a length proportional to the number of unread messages to the total number of messages in the time interval 110. Unseen messages are counted as unread, so the numbers 120 and 122 (FIG. 6) are added. Similarly, a read portion 192 of the bar has a length proportional to the number 124 of read messages to the total number 126 of messages. The graphical indicator 90 thus remains at fixed length, which is advantageous when employed as a content-area separator, while providing message status information to the user.

Figure 11A:
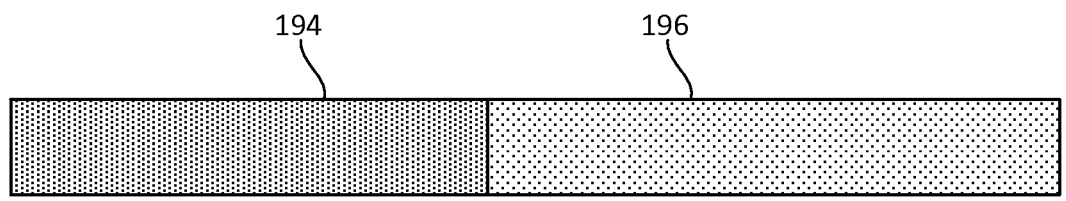
FIGS. 11a-11c show examples of the graphical indicator for read and unread messages.
Figure 11B:
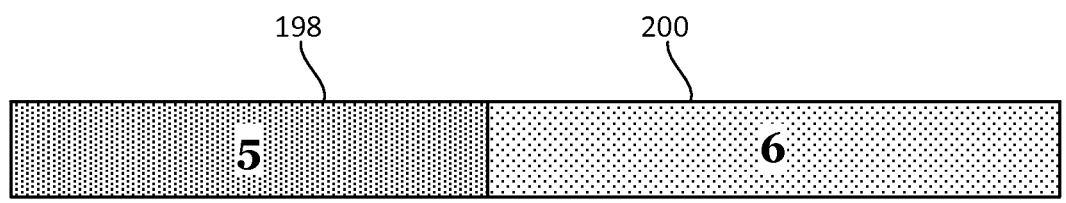
Figure 11C:
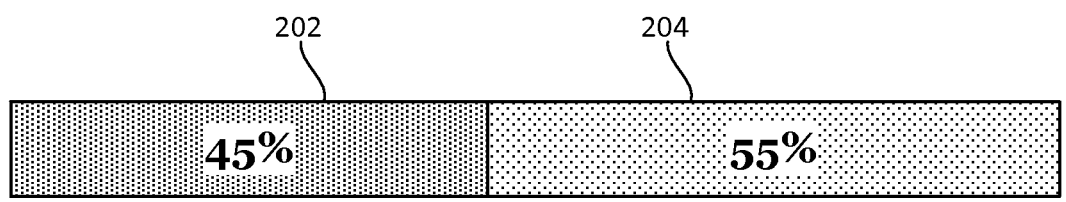

FIGS. 11a-11c show various embodiments of the graphical indicator 90. In some embodiments, only differently colored areas 194, 196 are provided, as illustrated in FIG. 11a. When values are not shown inside the areas, the graphical indicator 90 can advantageously be made thin (e.g., a few pixels in width). In other embodiments, differently colored areas 198, 200 are provided along with the numbers 122, 124 of unread and read messages, as illustrated in FIG. 11b. In still other embodiments, differently colored areas 202, 204 are provided along with values, such as percentages, or other relative indications of the numbers 122, 124 of unread and read messages, as illustrated in FIG. 11c.

Figure 12:
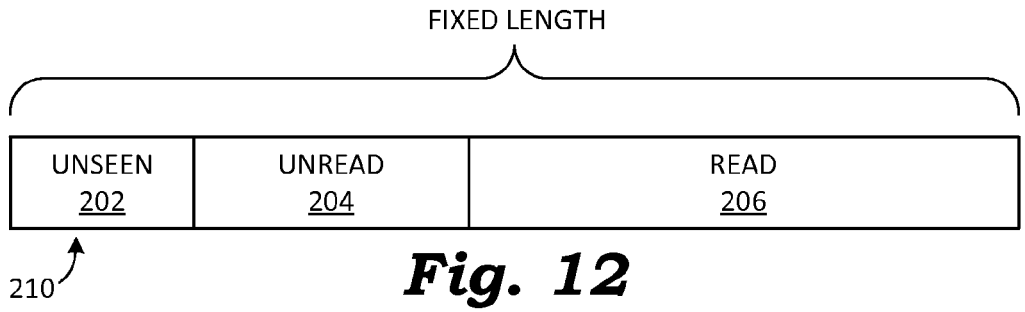
FIG. 12 is a diagram of the graphical indicator for unseen, unread, and read messages.

FIG. 12 shows a diagram of the graphical indicator 210 according to another embodiment. Features and aspects of the graphical indicator 90 can be used with the graphical indicator 210 and, for sake of clarity, only differences will be described in detail.

In this embodiment, the graphical indicator 210 is a fixed-length rectangular bar having proportions defined by different colors. An unseen portion 202 of the bar has a length proportional to the number 120 (FIG. 6) of unseen messages to the total number 126 of messages in the time interval 110 (which may also be known as a "time span"). A separate and distinct unread portion 204 of the bar has a length proportional to the number 122 of unread messages to the total number 126 of messages in the time interval 110. A read portion 204 of the bar has a length proportional to the number 124 of read messages to the total number 126 of messages. Showing the unseen portion 202 as separate and distinct from the unread portion 204 provides additional information to the user for assessment of progress in processing messages, in that unread messages may require less attention or processing than unseen messages, which may present the user with a reason to at least invoke the message listing interface 88 (FIG. 4).

Figure 13A:
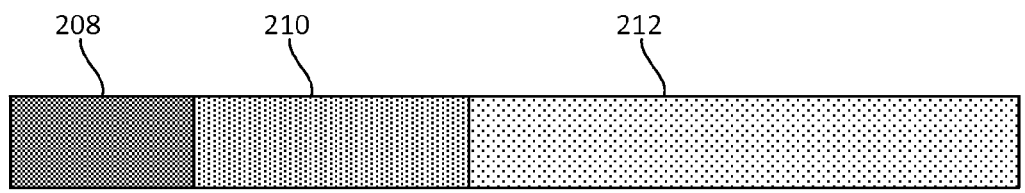
FIGS. 13a-13c show examples of the graphical indicator for read and unread messages.
Figure 13B:
Figure 13C:
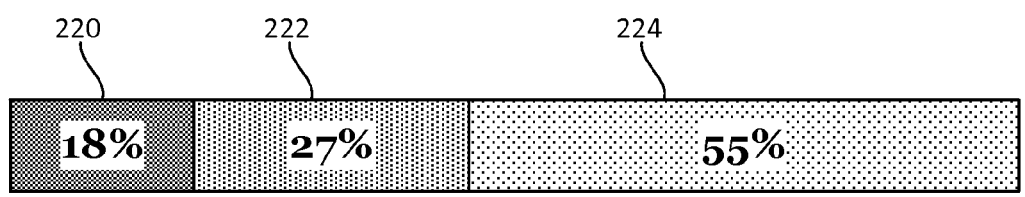

FIGS. 13a-13c show various embodiments of the graphical indicator 210. In some embodiments, only differently colored areas 208, 210, 212 are provided, as illustrated in FIG. 13a. In other embodiments, differently colored areas 214, 216, 218 are provided along with the numbers 120, 122, 124 of unseen, unread, and read messages, as illustrated in FIG. 13b. In still other embodiments, differently colored areas 220, 222, 224 are provided along with values, such as percentages, or other relative indications of the numbers 120, 122, 124 of unseen, unread, and read messages, as illustrated in FIG. 13c.

Figure 14:
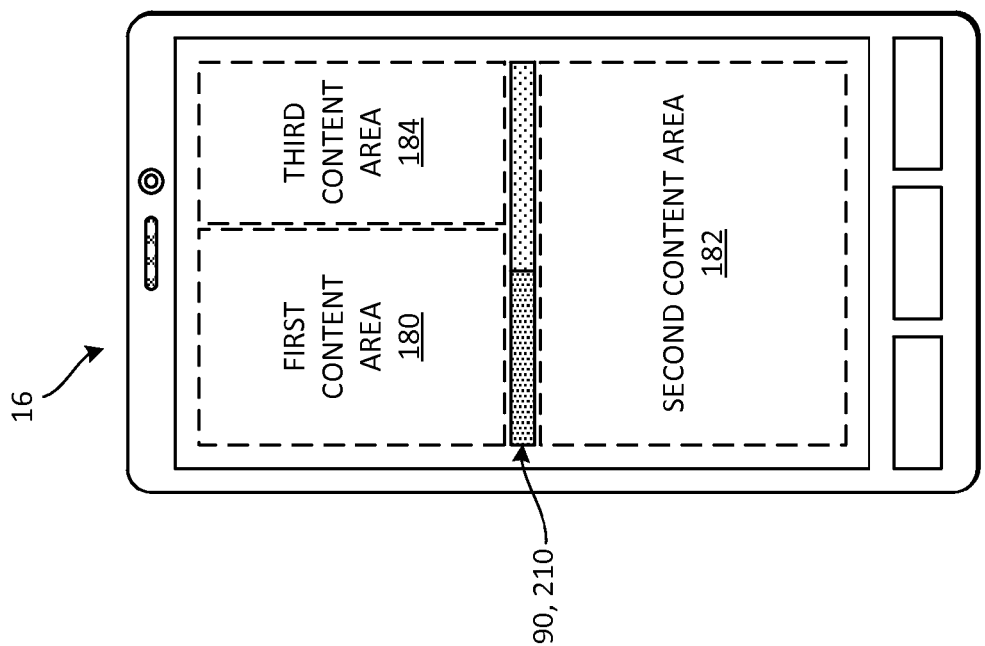
FIG. 14 is a front view of the mobile electronic device showing three user interface areas separated by a graphical indicator.

FIG. 14 shows a graphical indicator 90, 210, without a time-interval indicator, used to separate more than two content areas 180-184. In the example shown, multiple content areas 180, 184 are on one side of the graphical indicator 90, 210, while one content area is on the opposite side of the graphical indicator 90, 210. This embodiment serves to illustrate that any number of content areas containing distinct content can be located on either side of the graphical indicator 90, 210, and further than the time-interval indicator is optional.

Figure 15:
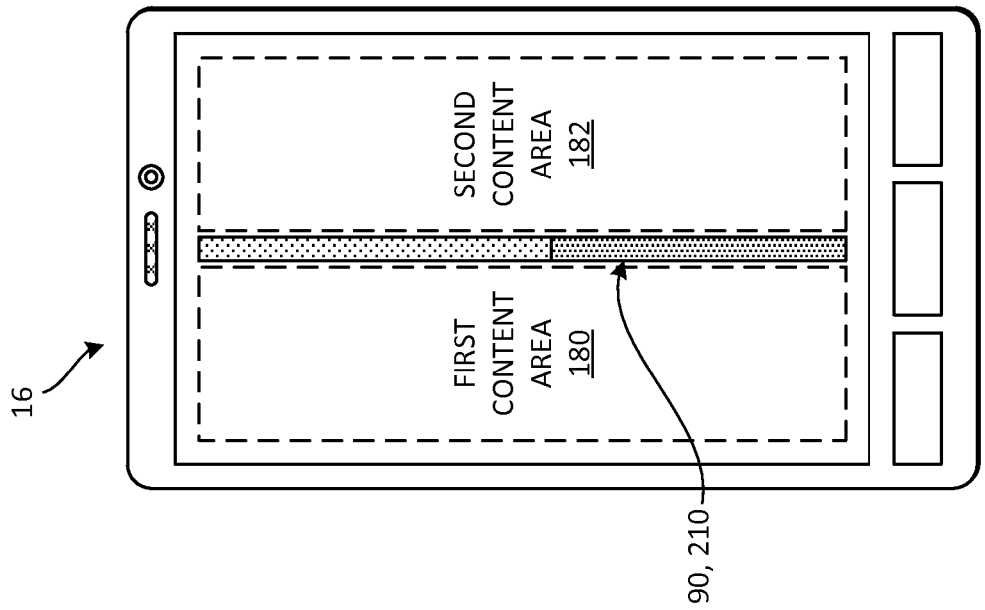
FIG. 15 is a front view of the mobile electronic device showing user interface areas separated by a graphical indicator of a different orientation.

FIG. 15 shows a graphical indicator 90, 210, without a time-interval indicator, used to separate distinct content areas 180, 182 in a lengthwise orientation, relative to the longer side of the device 16. This embodiment serves to illustrate that the orientation of the graphical indicator 90, 210 is not particularly limited.

Figure 16:
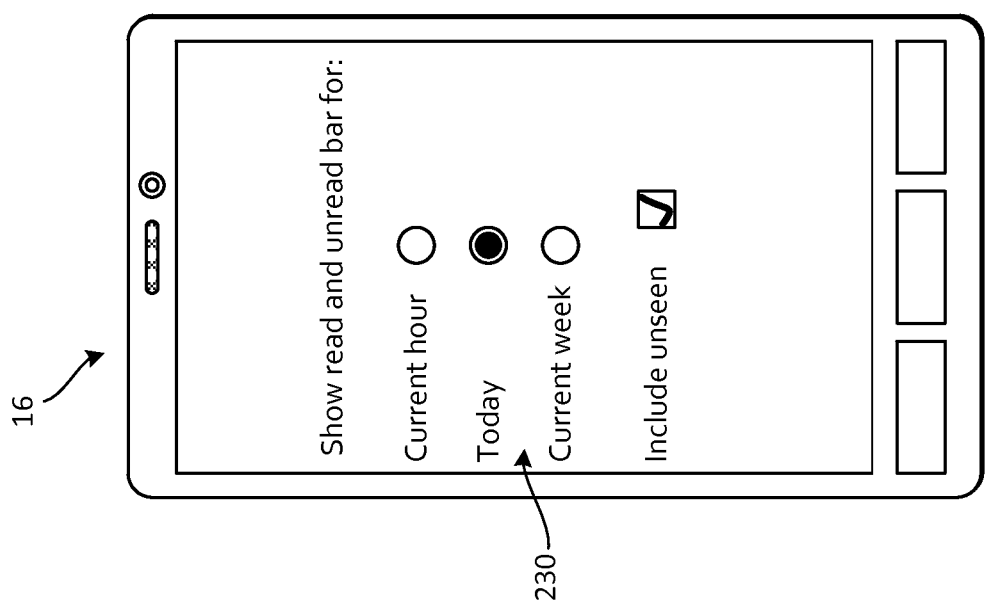
FIG. 16 is a front view of the mobile electronic device showing a configuration interface for the graphical indicator.

FIG. 16 shows a configuration interface 230 for selecting the time interval as well as selecting whether unseen messages are to be included in the graphical indicator. In the example shown, selectable time intervals include the current hour, current day, and current week. Further, indicating that unseen messages are to be counted as distinct from unread messages, selects the type of graphical indicator to be displayed. If unseen messages are to be treated the same as unread messages, then the graphical indicator 90 is selected. If unseen messages are to be treated distinct from unread messages, then the graphical indicator 210 is selected.

Figure 17:
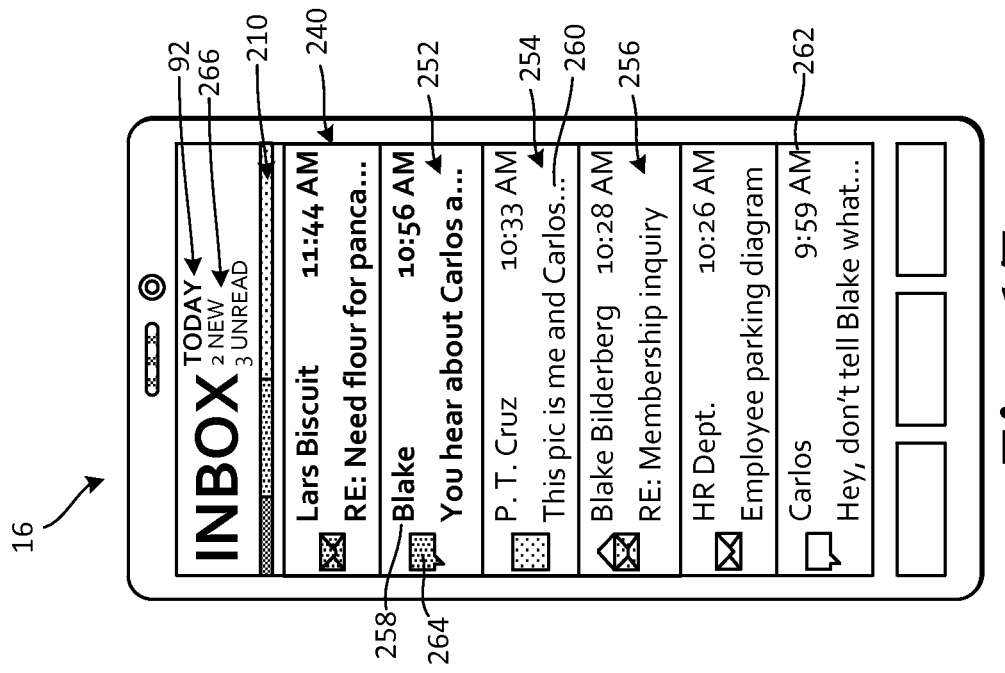
FIG. 17 is a front view of the mobile electronic device showing a message listing interface containing different types of messages.

FIG. 17 illustrates a message listing interface 240 according to another embodiment. The message listing interface 240 is similar to the message listing interface 88 and only differences will be described in detail. For other features and aspects of the message listing interface 240, the description of the interface 88 can be referenced, with like reference numerals denoting like elements. The message listing interface 240 may be known as a message hub, common inbox, or unified inbox.

The message listing interface 240 is configured to show messages, conversations, or threads for different modes of communication, such as instant messaging, email, SMS messaging, social media messaging or updating, and similar modes of communication that include time-based messages. Different types of message indicators 252, 254, 256, which may represent individual messages or message histories (i.e., threads or conversations), are displayed in a predetermined order, such as reverse-chronological order. In the example shown, the message indicator 252 represents an instant messaging conversation, the message indicator 254 represents a social media update message, and the message indicator 256 represents an email thread. Each of the message indicators may include the name 258 or other identifier of the correspondent, a snippet or portion 260 of content of the most recent message, a timestamp 262 of the most recent message, and an icon 264 representative of the mode of communication.

The appearance of the icons 264 as well as the text 258, 260, 262 may be configured as a graphical indicator that changes based on the status of the related message. For instance, as illustrated, previously unseen messages (e.g., top two in the list) have icons and text according to a first format (e.g., bold text and high-contrast icon coloring), unread messages (e.g., the middle two in the list) have icons and text according to a second format (e.g., less bold text and more subdued coloring), while read messages (e.g., the bottom two in the list) have icons and text according to a third format (e.g., normal weight text and most subdued coloring). In some embodiments, a graphical indicator can include one or more icons 264 that are animated for unseen messages. Such animation can be displayed for a short duration (e.g., 3 seconds, 10 seconds, etc.) immediately after the message listing interface 240 is invoked, so as to draw the user's attention to unseen messages. In still further embodiments, one or more of the text elements 258, 260, 262 can be provided with a similar animation. It is advantageous that messages of different types are provided with graphical indicators according to status, so that the user is drawn to messages having statuses that require attention regardless of message type.

The message indicators 252, 254, 256 can be configured to respond to a selection by opening the message reading interface (e.g., ref. 160 of FIG. 8) of the associated application program and displaying the selected message therein. As discussed elsewhere herein, displaying a message in a message reading interface can be configured to cause the status of the message to change from "unread" to "read". Alternatively, the message indicators 252, 254, 256 can be configured to respond to a selection by opening the message listing interface (e.g., ref. 88 of FIG. 4) of the associated application program and displaying the selected message therein. As also discussed elsewhere herein, displaying a new message in a message listing interface can be configured to cause the status of the message to change from "unseen" to "unread".

For purposes of counting unseen, unread, and read messages for the interface 240, the table of message data 52 shown in FIG. 5 can be configured to reference different kinds of messages via the message IDs 100. That is, the message IDs 100 may store values of foreign keys of databases that store the content and other data of the different kinds of messages. The received time 104 and message status 102 may be pulled from such databases using queries limited to a selected time interval. Thus, the table of message data 52 provides for counts of messages of various types by status and time interval. Accordingly, numbers of unseen, unread, and read messages, regardless of message type, may be obtained.

Referring back to FIG. 17, the message listing interface 240 displays the graphical indicator 210 (or 90) above a content area containing the message indicators 252, 254, 256 and below a content area containing a description of the interface 240 (i.e., "INBOX"), numbers 266 of unseen messages (i.e., "NEW") and unread messages of the different types, as well as the time-interval indicator 92. The numbers 266 represent totals based on message status and the time interval, regardless of message type. The content areas are next to the graphical indicator 210 and are separated by the graphical indicator 210.

Further, in some embodiments, the message indicators displayed in the message listing interface 240 are constrained by the time-interval indicator 92, in that only those message indicators representing messages that have been received within the selected time interval are shown in the message listing interface 240.

Thus, a user can reference the message listing interface 240 to obtain a quick and reliable assessment of the progress in processing messages, even though such messages are of different types. That is, the user is given total counts for unseen and unread messages, so that a total message processing burden is accurately reflected.

Figure 18:
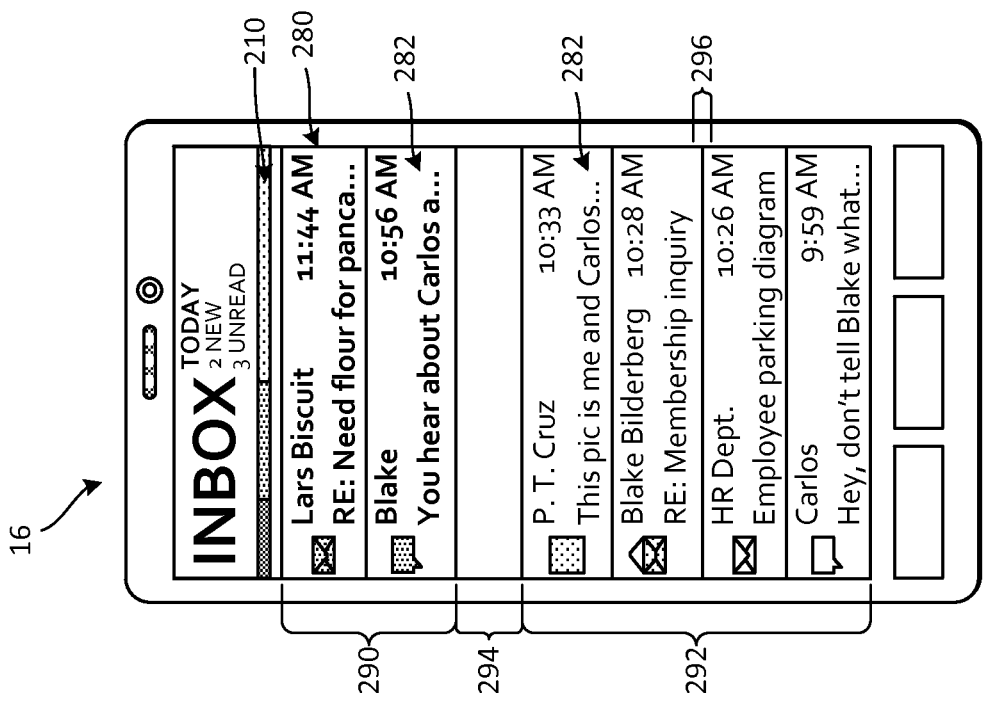
FIG. 18 is a front view of the mobile electronic device showing a message listing interface having a gap between groups of messages.

FIG. 18 illustrates a message listing interface 280 according to another embodiment. The message listing interface 280 is similar to the message listing interfaces 240, 88 and only differences will be described in detail. For other features and aspects of the message listing interface 280, the description of the interfaces 240, 88 can be referenced, with like reference numerals denoting like elements. The message listing interface 280 may be known as a message hub, common inbox, or unified inbox.

The message listing interface 280 can include the graphical indicator 210 or other such graphical indicator as discussed herein.

The message listing interface 280 can further include two or more groups of one or more message indicators 282. An unseen message group 290 includes message indicators 282 for messages that have been received since the last time the message listing interface 280 was displayed. Further, a seen message group 292, including message indicators 282 for messages of other statuses such as unread and read, can be provided to the message listing interface 280. The seen message group 292 includes message indicators for messages that were received before the last time the message listing interface 280 was displayed.

The unseen message group 290 may be positioned above the seen message group 292, and this may be by virtue of a reverse-chronological ordering of the listing interface 280. When the ordering is other than reverse-chronological, the unseen message group 290 can be configured to be positioned above the seen message group 292 irrespective of message ordering.

A gap 294 can be provided between the groups 290, 292 to separate the unseen message group 290 from the seen message group 292. The gap 294 is a graphical indicator that can be sized as larger than a spacing 296 between adjacent text or other elements of adjacent message indicators 282, so as to be readily apparent to the user. In some embodiments, the gap 294 is greater than about twice the spacing 296. In other embodiments, the gap 294 is greater than about four times the spacing 296. The gap 294 can be configured to be variable and, for example, can be based on font size or other mutable visual aspect of the message indicators 282. The size of the gap 294 can be selected based on tests with representative users, wherein the gap 294 is large enough to be readily noticed by such users but not too large so as to waste space on the limited display.

The gap 294 advantageously permits the user to readily identify messages that have newly arrived since the last time the listing interface 280 was displayed. The gap 294 draws the user attention, such that message indicators 282 above the gap 294 are given higher prominence than message indicators 282 below the gap 294.

In addition, as discussed elsewhere herein, message indicators 282 of the unseen group 290 can be provided with color, animation, or other visual indicator to further draw the user's attention to unseen messages.

According to one aspect of the present disclosure, a method, in an electronic device having a display, includes outputting on the display a graphical indicator representative of a number of unread messages relative to a number of received messages.

The received messages can be received within a time interval.

The method can further include determining from the received messages a number of unread messages having a time of reception within the time interval, determining from the received messages a number of read messages having a time of reception within the time interval, and determining a value which corresponds to the number of unread messages relative to the number of received messages.

The method can further include utilising the value to generate the graphical indicator.

The method can further include receiving the messages and storing the messages within a message store.

Determining the value can include determining the value based on the number of unread messages relative to the number of received messages, wherein the number of messages in the message store is greater than the number of received messages received within the time interval.

The method can further include outputting the graphical indicator showing i) the number of unread messages relative to the number of received messages, ii) a number of read messages relative to the number of received messages, and iii) a number of unseen messages relative to the number of received messages.

The method can further include outputting one or more message indicators for one or more unseen messages separated from message indicators of other messages.

The method can further include outputting a time-interval indicator next to the graphical indicator, the time-interval indicator configured to display an indication of the time interval.

According to another aspect of the present disclosure, a mobile electronic device includes a communications interface configured to receive messages from a network, a display configured to output received messages, memory configured to store message data, a processor coupled to the communications interface, the display, the input interface, and the memory. The processor is configured to provide a graphical indicator to the display, the graphical indicator showing a number of unread messages relative to a number of received messages.

The received messages can be received within a time interval.

The processor can be further configured to determine from the received messages a number of unread messages having a time of reception within the time interval, determine from the received messages a number of read messages having a time of reception within the time interval, and determine a value which corresponds to the number of unread messages relative to the number of received messages.

The processor can be further configured to utilise the value to generate the graphical indicator.

The processor can be further configured to receive the messages and storing the messages within a message store.

The processor can be configured to determine the value by determining the value based on the number of unread messages relative to the number of received messages, wherein the number of messages in the message store is greater than the number of received messages received within the time interval.

The device can further include a user interface, and the processor can be configured to determine the time interval from the group comprising: i) a user-specified time interval, wherein the user interface is configured to receive user selection of the time interval, and ii) a device-specified time interval.

The processor can be further configured to provide a message arrangement to the display, the message arrangement comprising outputting one or more message indicators for one or more unseen messages separated from message indicators of other messages.

The processor can be further configured to provide a time-interval indicator for display next to the graphical indicator, the time-interval indicator configured to output an indication of the time interval.

According to another aspect of the present disclosure, a non-transitory computer-readable medium includes at least a program that when executed by a processor configures the processor to provide a graphical indicator to the display, the graphical indicator representative of a number of unread messages relative to a number of received messages.

The received messages can be received within a time interval.

The program can further configure the processor to determine from the received messages a number of unread messages having a time of reception within the time interval, determine from the received messages a number of read messages having a time of reception within the time interval, and determine a value which corresponds to the number of unread messages relative to the number of received messages.

The program can further configure the processor to utilize the value to generate the graphical indicator.

The program can further configure the processor to receive the messages and store the messages within a message store.

The program can further configure the processor to determine the value based on the number of unread messages relative to the number of received messages, wherein the number of messages in the message store is greater than the number of received messages received within the time interval.

The program can further configure the processor to output the graphical indicator showing i) the number of unread messages relative to the number of received messages, ii) a number of read messages relative to the number of received messages, and iii) a number of unseen messages relative to the number of received messages.

The program can further configure the processor to output one or more message indicators for one or more unseen messages separated from message indicators of other messages.

The program can further configure the processor to output a time-interval indicator next to the graphical indicator, the time-interval indicator configured to display an indication of the time interval.

According to other aspects of the present disclosure, a method, device, and non-transitory computer-readable medium can provide for visually distinguishing output of unseen messages from other messages. The visually distinguishing can include outputting unseen message indicators to a display as spaced apart or separated from indicators outputted for the other messages. Spacing apart or separating groups of message indicators can include providing a gap therebetween.

In any of the above aspects, the time interval can be one or more of: i) user-specified and ii) determined by the device.

In any of the above aspects, the graphical indicator can include a fixed-length bar having a plurality of portions. Each portion can represent a respective different group of message statuses selected from the group comprising: unread messages, read messages, urgent messages and unseen messages. Each portion can have a different visual appearance.

In any of the above aspects, the number of unread messages can be shown by a first portion of the bar and the number of read messages can be shown by a second portion of the bar.

In any of the above aspects, the graphical indicator can include a fixed-length bar positioned to separate an interface into at least two different content areas.

In any of the above aspects, the received messages can be of different types corresponding to different modes of communication.

While the foregoing provides certain non-limiting example embodiments, it should be understood that combinations, subsets, and variations of the foregoing are contemplated. The monopoly sought is defined by the claims.

What is claimed is:

1. A method, in a mobile electronic device having a display, comprising:
   outputting on the display, in a message listing interface, and adjacent a list of received messages, a graphical indicator representative of a number of unread messages relative to a number of the received messages stored in a message store, the graphical indicator comprising a fixed-length bar having a plurality of portions, each of the plurality of portions representing a respective different group of message statuses selected from the group comprising: unread messages, read messages, urgent messages and unseen messages, each of the plurality of portions having a different visual appearance, each the plurality of portions having a respective relative length based on a respective number of messages in the respective different group of message statuses; each of the plurality of portions of the fixed-length bar being dedicated to representing relative numbers of the respective messages, the fixed-length bar lacking blank space; a portion, of the plurality of portions, becoming larger as the respective number of messages that the portion is representing increases, relative to other portions of the plurality of portions; and the portion becoming smaller as the respective number of messages that the other portions are representing increases relative to the respective number of messages that the portion is representing.

2. The method of claim 1, wherein the received messages are received within a time interval.

3. The method of claim 2, further comprising:
   determining from the received messages the number of unread messages having a time of reception within the time interval;
   determining from the received messages a number of read messages having a time of reception within the time interval; and
   determining a value which corresponds to the number of unread messages relative to the number of received messages.

4. The method of claim 3, further comprising utilising the value to generate the graphical indicator.

5. The method of claim 3, further comprising receiving the messages and storing the messages within a message store.

6. The method of claim 5, wherein determining the value comprises determining the value based on the number of unread messages relative to the number of received messages, wherein the number of messages in the message store is greater than the number of received messages received within the time interval.

7. The method of claim 2, wherein the time interval is one or more of: i) user-specified and ii) determined by the device.

8. The method of claim 1, further comprising:
   outputting the graphical indicator showing i) the number of unread messages relative to the number of received messages, ii) a number of read messages relative to the number of received messages, and iii) a number of unseen messages relative to the number of received messages.

9. The method of claim 1, further comprising outputting one or more message indicators for one or more unseen messages separated from message indicators of other messages.

10. The method of claim 1, wherein the number of unread messages is shown by a first portion of the bar and the number of read messages is shown by a second portion of the bar.

11. The method of claim 1, further comprising outputting a time-interval indicator next to the graphical indicator, the time-interval indicator configured to display an indication of the time interval.

12. The method of claim 1, wherein the graphical indicator comprises a fixed-length bar positioned to separate an interface into at least two different content areas.

13. The method of claim 1, wherein the received messages are of different types corresponding to different modes of communication.

14. A mobile electronic device comprising:
   a communications interface configured to receive messages from a network;
   a display configured to output received messages;
   memory configured to store message data in a message store;
   a processor coupled to the communications interface, the display, the input interface, and the memory, the processor configured to:
      provide a graphical indicator to the display, in a message listing interface, and adjacent a list of received messages, the graphical indicator showing a number of unread messages relative to a number of the received messages stored in the message store, the graphical indicator comprising a fixed-length bar having a plurality of portions, each of the plurality of portions representing a respective different group of message statuses selected from the group comprising: unread messages, read messages, urgent messages and unseen messages, each the plurality of portions having a different visual appearance, each of the plurality of portions having a respective relative length based on a respective number of messages in the respective different group of message statuses; each of the plurality of portions of the fixed-length bar being dedicated to representing relative numbers of the respective messages, the fixed-length bar lacking blank space; a portion, of the plurality of portions, becoming larger as the respective number of messages that the portion is representing increases, relative to other portions of the plurality of portions; and the portion becoming smaller as the respective number of messages that the other portions are representing increases relative to the respective number of messages that the portion is representing.

15. The device of claim 14, wherein the received messages are received within a time interval.

16. The device of claim 15, further comprising a user interface, and the processor configured to determine the time interval from the group comprising: i) a user-specified time interval, wherein the user interface is configured to receive user selection of the time interval, and ii) a device-specified time interval.

17. The device of claim 14, wherein the processor is further configured to:
provide the graphical indicator to the display, the graphical indicator showing i) the number of unread messages relative to the number of received messages, ii) a number of read messages relative to the number of received messages, and iii) a number of unseen messages relative to the number of received messages.

18. The device of claim 14, wherein the processor is further configured to provide a message arrangement to the display the message arrangement comprising outputting one or more message indicators for one or more unseen messages separated from message indicators of other messages.

19. The device of claim 14, wherein the number of unread messages is shown by a first portion of the bar and a number of read messages is shown by a second portion of the bar.

20. The device of claim 15, wherein the processor is further configured to provide a time-interval indicator for display next to the graphical indicator, the time-interval indicator configured to output an indication of the time interval.

21. A non-transitory computer-readable medium comprising at least a program that when executed by a processor configures the processor to:
provide a graphical indicator to a display of a mobile electronic device, in a message listing interface, and adjacent a list of received messages, the graphical indicator showing a number of unread messages relative to a number of the received messages stored in the message store, the graphical indicator comprising a fixed-length bar having a plurality of portions, each of the plurality of portions representing a respective different group of message statuses selected from the group comprising: unread messages, read messages, urgent messages and unseen messages, each of the plurality of portions having a different visual appearance, each the plurality of portions having a respective relative length based on a respective number of messages in the respective different group of message statuses; each of the plurality of portions of the fixed-length bar being dedicated to representing relative numbers of the respective messages, the fixed-length bar lacking blank space; a portion, of the plurality of portions, becoming larger as the respective number of messages that the portion is representing increases, relative to other portions of the plurality of portions; and the portion becoming smaller as the respective number of messages that the other portions are representing increases relative to the respective number of messages that the portion is representing.

\* \* \* \* \*